(12) United States Patent
Xu

(10) Patent No.: US 11,561,459 B2
(45) Date of Patent: Jan. 24, 2023

(54) STAND AND USE THEREOF

(71) Applicant: ZHEJIANG DAHUA TECHNOLOGY CO., LTD., Zhejiang (CN)

(72) Inventor: Fuyu Xu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 62 days.

(21) Appl. No.: 17/013,547

(22) Filed: Sep. 5, 2020

(65) Prior Publication Data

US 2020/0399934 A1 Dec. 24, 2020

Related U.S. Application Data

(63) Continuation of application No. PCT/CN2018/123854, filed on Dec. 26, 2018.

(30) Foreign Application Priority Data

Mar. 5, 2018 (CN) .......................... 201820299562.4

(51) Int. Cl.
*G03B 17/56* (2021.01)
*F16M 13/02* (2006.01)
*E05B 73/00* (2006.01)

(52) U.S. Cl.
CPC .......... *G03B 17/561* (2013.01); *F16M 13/022* (2013.01); *E05B 73/0017* (2013.01)

(58) Field of Classification Search
CPC .... G03B 17/56; G03B 17/561; G03B 17/566; F16M 11/00; F16M 11/02; F16M 11/04;
(Continued)

(56) References Cited

U.S. PATENT DOCUMENTS 4,523,356 A * 6/1985 Charlot, Jr. ......... E05B 73/0017
24/706.8
2017/0160625 A1 6/2017 Bright
2018/0187828 A1 * 7/2018 Law ...................... F16M 13/02

FOREIGN PATENT DOCUMENTS

CN 102606857 A 7/2012
CN 204378633 U * 6/2015 ........... A47F 7/0246
(Continued)

OTHER PUBLICATIONS

The Extended European Search Report in European Application No. 18909248.9 dated Feb. 23, 2021, 6 pages.
(Continued)

*Primary Examiner* — Clayton E. LaBalle
*Assistant Examiner* — Fang-Chi Chang
(74) *Attorney, Agent, or Firm* — Metis IP LLC

(57) ABSTRACT

A stand (100) is disclosed. The stand (100) may include a first connecting component and a second connecting component. The first connecting component may include at least one fixing element and a chamber. The chamber may have an opening. The second connecting component may include an insertion portion including at least one fixing element and a chamber. The chamber may have an opening. When the insertion portion of the second connecting component is inserted, along an axis in an insertion direction, into the chamber through the opening, the fixing element in the first connecting component may work in pairs with the insertion portion to cause the first connecting component to be connected with the second connecting component.

12 Claims, 6 Drawing Sheets

(58) Field of Classification Search
CPC ...... F16M 11/041; F16M 11/16; F16M 11/18; F16M 11/20; F16M 13/00; F16M 13/005; F16M 13/02; F16M 13/022; F16M 13/025; F16M 13/027; F16M 13/04; F16M 2200/00; F16M 2200/02; F16M 2200/025; F16M 2200/027; F16M 2200/028; F16B 2/00; F16B 2/02; F16B 2/14; F16B 2/16

See application file for complete search history.

(56) References Cited

FOREIGN PATENT DOCUMENTS

| | | |
|---|---|---|
| CN | 205665509 U | 10/2016 |
| CN | 107326482 A | 11/2017 |
| DE | 202009010269 U1 | 10/2009 |
| DE | 202009017494 U1 | 3/2010 |
| JP | 4560689 B2 | 10/2010 |
| WO | 2012173746 A2 | 12/2012 |
| WO | 2019169937 A1 | 9/2019 |

OTHER PUBLICATIONS

International Search Report in PCT/CN2018/123854 dated Feb. 14, 2019, 5 pages.
Written Opinion in PCT/CN2018/123854 dated Feb. 14, 2019, 5 pages.

* cited by examiner

STAND AND USE THEREOF

CROSS-REFERENCE TO RELATED APPLICATIONS

This application is a continuation of International Application No. PCT/CN2018/123854, filed on Dec. 26, 2018, which claims priority to Chinese Patent Application No. 201820299562.4 filed on Mar. 5, 2018, the entire contents of which are hereby incorporated by reference.

TECHNICAL FIELD

The present disclosure generally relates to a stand for supporting an item, and in particular, to an anti-theft stand that may be easily assembled and dissembled.

BACKGROUND

Many items, such as a camera, are used with a stand for support and/or removable attachment to a surface that need to be assembled and disassembled from the stand frequently. A camera, as convenient equipment for recording scenes in a particular moment, is widely used all over the world. Sometimes, a camera may be mounted on a camera stand to improve the capturing stability of the camera. One end of the camera stand may be operably connected to the camera while the other end of the camera stand may be attached to a supporting surface. The supporting surface may include a table, a ceiling, a wall, a shelf, etc.

Currently, an integrated camera stand is becoming increasingly popular because of the easiness of installation and flexibility in replacement of components. The integrated camera stand may include a bottom component attached to the supporting surface and a top component connected to the camera. The top component and the bottom component may each include a magnet of opposite polarities such that the top component and the bottom component may attract each other. This conventional integrated camera may be very unstable. For example, the top component may be moved up and down or left and right easily, because the magnetic force between the top component and the bottom component is merely in the axial direction connecting the top component and the bottom component. Because the magnetic force is also relatively weak, the camera together with the top component may be easily stolen by force. If the top component and the bottom component are fixedly connected to each other via, e.g., screw and nut, adhesive, the camera may have a good anti-theft feature and stability but may be difficult to be dissembled.

Therefore, it is desired to provide a stand that may be stable and anti-theft while also easy to be assembled and disassembled.

SUMMARY

According to an aspect of the present disclosure, a stand is provided. The stand may include a first connecting component and a second connecting component. The first connecting component may include at least one fixing element and a chamber. The chamber may have an opening. The second connecting component may include an insertion portion including at least one fixing element and a chamber, the chamber having an opening. When the insertion portion of the second connecting component is inserted, along an axis in an insertion direction, into the chamber through the opening, the at least one fixing element in the first connecting component may work in pairs with the insertion portion to cause the first connecting component to be connected with the second connecting component.

In some embodiments, when the first connecting component is connected with the second connecting component, the first connecting component and the second connecting component may be locked relative to each other in a direction that is the same as or opposite to the insertion direction, and the first connecting component and the second connecting component may be rotatable relative to each other about the axis along the insertion direction.

In some embodiments, when the insertion portion is inserted into the chamber through the opening, the at least one fixing element is secured between an inner wall of the chamber and the insertion portion to cause the first connecting component to be connected with the second connecting component.

In some embodiments, the insertion portion may include an annular groove. When the insertion portion is inserted into the chamber through the opening, the at least one fixing element is secured between the inner wall of the chamber and the annular groove of the insertion portion.

In some embodiments, the stand may further include an elastic component placed in the chamber. The elastic component may be configured to cause the at least one fixing element to be secure between the inner wall of the chamber and the insertion portion.

In some embodiments, the elastic component may be relaxed before the insertion portion is inserted into the chamber. When the insertion portion is inserted into the chamber, the elastic component may be compressed and generate a compressive force that causes the at least one fixing element to be secured between the inner wall of the chamber and the insertion portion.

In some embodiments, the at least one fixing element may be made of a magnetic material. The stand may further include a first magnet placed in the second connecting component. The first magnet may be configured to cause the at least one fixing element to be secured between the inner wall of the chamber and the insertion portion.

In some embodiments, when the insertion portion is inserted into the chamber through the opening, the first magnet may attract the at least one fixing element towards the second connecting component and cause the at least one fixing element to be secured at a first location between the inner wall of the chamber and the insertion portion.

In some embodiments, a second magnet may be placed on a side of the first connecting component. The second magnet may be configured to attract the at least one fixing element in a direction away from the second connecting component. The second magnet may be further configured to cause the at least one fixing element to be displaced from the first location such that the at least one fixing element is no longer secured between the inner wall of the chamber and the insertion portion.

In some embodiments, the first connecting component may be operably connected to a camera.

According to another aspect of the present disclosure, a system is provided. The system may include an imaging apparatus and a stand connected to the imaging apparatus. The stand may include a first connecting component and a second connecting component. The first connecting component may include at least one fixing element and a chamber. The chamber may have an opening. The second connecting component may include an insertion portion including at least one fixing element and a chamber, the chamber having an opening. When the insertion portion of the second connecting component is inserted, along an axis in an insertion direction, into the chamber through the opening, the at least one fixing element in the first connecting component may work in pairs with the insertion portion to cause the first connecting component to be connected with the second connecting component.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not drawn to scale. These embodiments are non-limiting exemplary embodiments, in which like reference numerals represent similar structures throughout the several views of the drawings, and wherein.

DETAILED DESCRIPTION

Figure 1:
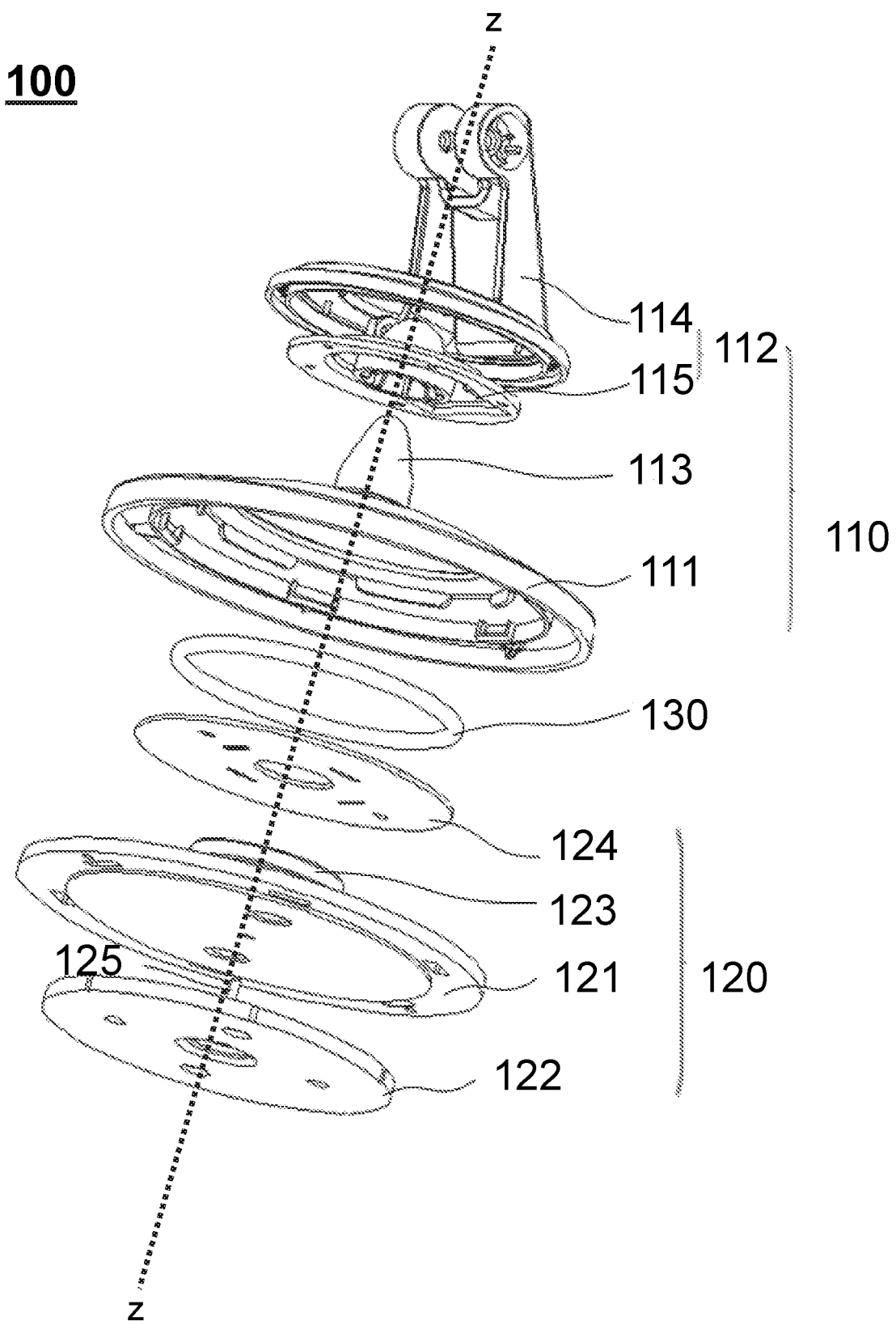
FIG. 1 is an exploded view of an exemplary camera stand according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of portions and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

In order to make the purpose, technical solution, and advantages of the present disclosure more clear, the present disclosure will be further described in detail below with reference to the accompanying drawings and embodiments. It should be understood that the specific embodiments described herein are merely illustrative of the present disclosure and are not intended to limit the present disclosure.

The following descriptions are provided with reference to a camera stand. It is understood that this is for illustration purposes and not intended to be limiting. The stand described herein may be used with other items as well. For instance, a stand disclosed herein may be used with a television, a laptop, a projector, etc.

It should be noted that the orientation of the camera stand may be the same as or different from that described in the present disclosure. For example, the camera stand may be attached to a ceiling. In this case, the orientation of the camera stand is completely reserved with respect to the present disclosure. For example, a bottom component of the camera stand may be attached to the ceiling, and a top component of the camera stand may be attached to the camera which is lower than the bottom component. This shall also stay within the protection scope of the present disclosure. People having ordinary skills in the art should understand that "top component" and "bottom component" are named as such merely because of their relative positions in exemplary embodiments, and shall not limit the positions of the top component and/or the bottom component during actual use. It should also be understood that terms such as "top," "bottom," "upper," "lower," "vertical," "lateral" "above," "below," "upward(s)," "downward(s)," "left-hand side," "right-hand side," "horizontal," and other such spatial reference terms are used in a relative sense to describe the positions or orientations of certain surfaces/parts/components of the camera stand in relationship to other such features of the camera stand when the camera stand is in a normal operating position and may change if the position or orientation of the camera stand changes.

The present disclosure relates to a stand for an item. For illustration purposes, without limiting, the descriptions are provided with reference to a camera stand. The camera stand may include a top component operably connected to a camera and a bottom component attached to a supporting surface. The top component may include a chamber and a plurality of fixing elements (e.g., metal spheres) placed in the chamber. The chamber may have an opening for receiving an insertion. The bottom component may include an insertion portion that may be inserted into the chamber through the opening. When the insertion portion is inserted into the chamber, the fixing elements may be secured between a groove of the insertion portion and an inner wall of the chamber. The securing between the insertion portion and the fixing elements may cause the top component to be locked with the bottom component. A spring may be placed in the chamber to generate a compressive force on the fixing elements, and a first magnetic may be placed in the bottom component to generate a magnetic force on the fixing elements. The compressive force and the magnetic force may further secure the fixing elements. When a second magnet, which provides a magnetic force greater than the compressive force and/or the magnetic force generated by the first magnet, is placed opposite to the opening, the fixing elements may no longer be secured. The fixing elements may be attracted to move out of the groove, and the top component may be easily disassembled with the bottom component.

FIG. 1 is an exploded view of an exemplary camera stand according to some embodiments of the present disclosure. As illustrated in FIG. 1, the camera stand 100 may include a top component 110, a bottom component 120, a connection ring 130 and/or any other suitable component for supporting a camera in accordance with various embodiments of the present disclosure.

The top component 110 (also referred to as a top lid component, an upper portion, or a first connecting component) may include a top body portion 111 (also referred to as a body portion of the top component 110), a camera support 112, and a cartridge 113. The top body portion 111 may be attached to one or more components of the bottom component 120 (e.g., the magnetic fixing board 124, the bottom body portion 121).

The camera support 112 may include a support part 114 and a decoration part 115. The support part 114 may be located at a top end of the top component 110. In some embodiments, a camera may be operably connected to the support part 114. The decoration part 115 may be placed near the bottom surface of the support part 114. The decoration part 115, despite its name, is not, or at least not only, for decoration purposes. The decoration part 115 may include a concave slot for holding the cartridge 113. The decoration part 115 may be fastened to the cartridge 113. Merely by way of example, the fastening of the decoration part 115 to the cartridge 113 may include employing a chemical (e.g., an adhesive), a mechanical structure (e.g., a screw and a nut, a hook and a loop), or the like, or any combination thereof.

The cartridge 113 may be a component to facilitate the locking of a part of the top component 110 with a part of the bottom component 120. For example, fixing elements (e.g., fixing elements 230) in a chamber (e.g., the chamber 220) of the cartridge 113 may be secured in the cartridge 113 between an annular groove (e.g., the annular groove 280) of an insertion portion (e.g., the insertion portion 260) and an inner wall of the cartridge 113. In some embodiments, the securing between the part of the top component 110 and the part of the bottom component 120 may cause the top component 110 and the bottom component 120 to be connected and locked with each other. The locking between the top component 110 and the bottom component 120 may prohibit them from translating in any direction relative to each other. The locking between the top component 110 and the bottom component 120, however, may allow the top component 110 and the bottom component 120 to rotate relative to each other about an axis along the direction towards or away from each other (e.g., the z-z axis illustrated in FIG. 1). The cartridge 113 may be located in the center of the top component 110 (e.g., between the camera support 112 and the top body portion). In some embodiments, the cartridge 113 form an integral piece with the top body portion 111.

The bottom component 120 (also referred to as a bottom lid component, a lower portion, or a second connecting component) may be removably fixed to a supporting surface. The supporting surface may include but not limited to a wall, a ceiling, a table, a shelf, or the like. In some embodiments, the bottom component 120 may be fixedly connected to the supporting surface for a reasonably long time, and the camera and/or the top component of the camera stand that matches with the camera may be replaceable. As the camera is mounted on the top component 110 and the bottom component 120 is connected with the supporting surface, the camera stand 100 may fix the camera indirectly on the supporting surface when the top component 110 and the bottom component 120 are locked with each other.

The bottom component 120 may include a bottom body portion 121, a base portion 122, and a magnetic fixing board 124. The bottom body portion 121 (also referred to as a body portion of the bottom component 120) may be sunk into the top body portion 111 when the top component 110 and the bottom component 120 are locked with each other. The first magnet 123 may be placed in or attached to the bottom body portion 121. To install and/or fix the first magnet 123, the magnetic fixing board 124 may be installed parallel to the bottom body portion 121. The first magnet 123 may be placed in a space between the bottom body portion 121 and the magnetic fixing board 124. More descriptions regarding the locations and functions of the first magnet 123 may be found elsewhere in the present disclosure, e.g., FIG. 2A and FIG. 2B.

The base portion 122 may be located at a bottom end of the bottom component 120. The base portion 122 may be connected to the supporting surface (e.g., a wall, a ceiling, a table, a shelf) using a chemical (e.g., an adhesive), a mechanical component (e.g., a nail, a screw and a nut, a hook and a loop), or the like, or any combination thereof. The base portion 122 may include an insertion portion 125 mounted on the surface of the base portion 122. In some embodiments, the insertion portion 125 may form an integral piece with the base portion 122 as a protrusion of the base portion 122.

A connection ring 130 may be placed between the top body portion 111 of the top component 110 and a bottom body portion 121 of the bottom component 120 to avoid direct contact between the top component 110 and the bottom component 120. The connection ring 130 may be made of a deformable or elastic material including, e.g., sponge, rubber, plastic, polymer, etc. When the bottom body portion 121 is connected with the top body portion 111, the connection ring 130 may be placed between them. In some embodiments, when the connection ring 130 is not used, the top body portion 111 of the top component 110 may directly contact the bottom body portion 121 of the bottom component 120. The top body portion 111 and the bottom body portion 121 may be made of one or more hard materials, such as plastic, metal, which may cause damage (e.g., wear on either or both of the top body portion 111 and the bottom body portion 121) and vibrations when in direct contact with each other. By placing the elastic and/or deformable connection ring 130 between the top body portion 111 and the bottom body portion 121, the wear between the bottom body portion 121 and the top body portion 111 may be reduced. The connection ring 130 may also act as a damper that may reduce vibration caused by the top component 120 and the bottom component 130. In some embodiments, the connection ring 130 may be assembled on an inner wall of the top body portion 111. Alternatively or additionally, the connection ring 130 may be assembled on an outer wall of the bottom body portion 121. The connection ring 130 may be a rubber band, a ring-shaped sponge, etc. The connection ring 130 may enable the top component 110 and the bottom component 120 to rotate relative to each other in a quiet and smooth manner.

Figure 2A:
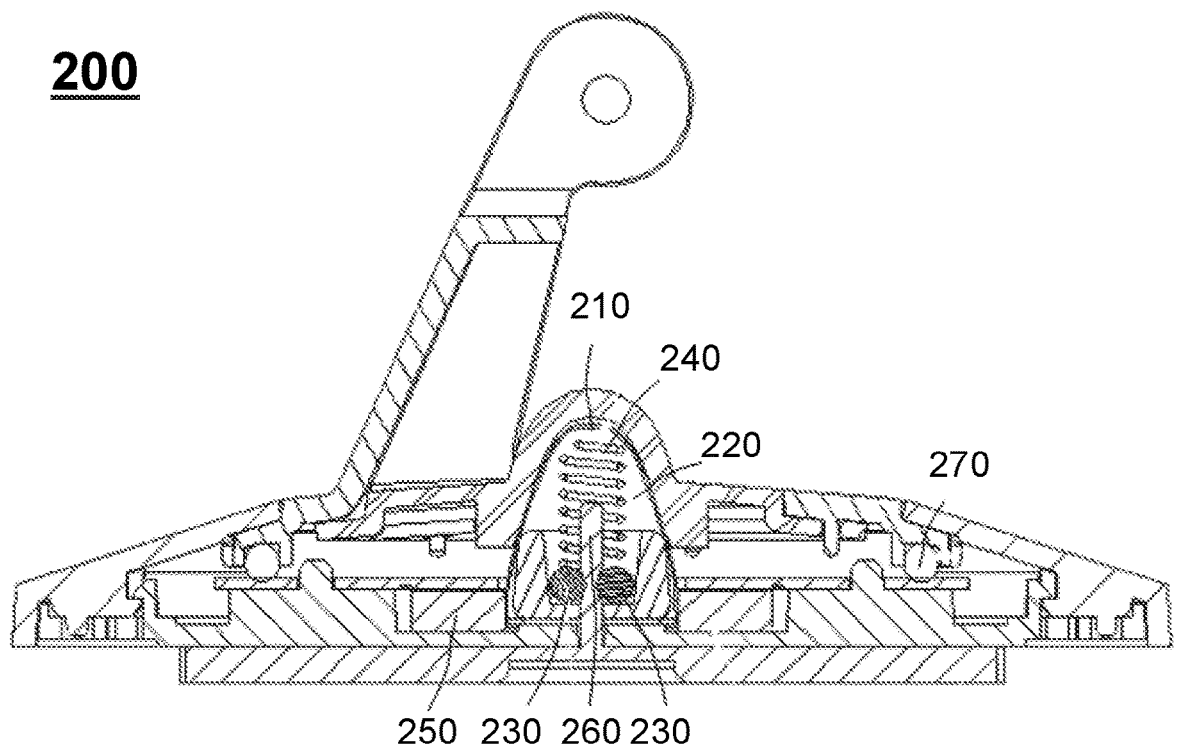
FIG. 2A is a cross-sectional view of an exemplary locked camera stand according to some embodiments of the present disclosure.

FIG. 2A is a cross-sectional view of an exemplary locked camera stand according to some embodiments of the present disclosure. As illustrated in FIG. 2A, the locked camera stand 200 may include a cartridge 210, a chamber 220, a plurality of fixing elements 230, an elastic component 240, a first magnet 250, an insertion portion 260, a connection ring 270, and a groove 280. In some embodiments, the cartridge 210 may correspond to the cartridge 113 in FIG. 1. The insertion portion 260 may correspond to the insertion portion 125 in FIG. 1. The connection ring 270 may correspond to the connection ring 130 in FIG. 1. The first magnet 250 may correspond to the first magnet 123 in FIG. 1.

The cartridge 210 may include the chamber 220. The chamber 220 may have the shape of a body of revolution. The slope section of the chamber 220 may have a shape formed by a revolution of a 2D shape about an axis in its plane. For example, the chamber 220 may have the shape of a cone, a cylinder, a circular truncated cone, or the like. The chamber 220 may provide an enclosed space formed by a slope section and an opening. The plurality of fixing elements 230 may be placed on a bottom inner surface of the chamber 220. A bottom end of the slope section may be connected to the bottom inner surface of the cartridge 210. The size of the opening may be less than the size of the plurality of fixing elements 230 such that the plurality of fixing elements 230 do not accidentally drop out of the chamber through the opening. The plurality of fixing elements 230 may be locked with the insertion portion 260 (e.g., the annular groove 280). For example, the number (count) of the plurality of fixing elements 230 may be any integer, such as 2, 3, 4, 5, 6, 8, 10, etc. The locking stability (e.g., how difficult the top component moves relative to the bottom component when locked) may be increased when the number (or count) of the fixing elements 230 is increased. In some embodiments, the number (count) of the plurality of fixing elements 230 may be one. In this case, the insertion portion 260 and the cartridge 210 may be designed such that the insertion portion 260 remains vertical when inserted or pulled out (e.g., with the help of a guide rail or guide groove).

In some embodiments, the plurality of fixing elements 230 may be made of a ferromagnetic metal including but not limited to cobalt, iron, nickel, manganese, etc., or an oxide thereof, or an alloy thereof, or any combination thereof. In some embodiments, at least two of the plurality of fixing elements 230 may have the same or different sizes and shapes. For example, the plurality of fixing elements 230 may be spheres of the same diameter. The insertion portion 260 may be inserted into the cartridge 210 through the opening of the cartridge 210. The plurality of fixing elements 230 may be locked with the insertion portion 260. More descriptions regarding the locking process may be found elsewhere in the present disclosure, e.g., FIG. 5A, FIG. 5B, and descriptions thereof.

The insertion portion 260 may include the groove 280. In some embodiments, the insertion portion 260 may also have the shape of a body of revolution. Merely by way of example, a width of the insertion portion 260 may be equal to or slightly less than the opening of the chamber 220 so that the insertion portion 260 may be inserted into the cartridge 210 through the opening of the chamber 220. After being inserted into the cartridge 210, the insertion portion 260 may contact the plurality of fixing elements 230. The plurality of fixing elements 230 may be secured between the inner wall of the cartridge 210 and the groove 280. For example, one side (outer side) of the plurality of fixing elements 230 may be engaged with an inner wall of the cartridge 210, and the other side (inner side) may be engaged with the groove 280 of the insertion portion 260.

To enhance the locking stability between the plurality of fixing elements 230 and the groove 280, the chamber 220 may include an elastic component 240. The elastic component 240 may be aligned with a center axis of the chamber 220 (e.g., an axis corresponding to an insertion direction of the insertion portion 260 to the opening of the chamber 220) of the cartridge 210. In some embodiments, the top end of the elastic component 240 may contact the top inner wall of the chamber 220, and the bottom end of the elastic component 240 may contact the plurality of fixing elements 230. The connection between the elastic component 240 and the plurality of fixing elements 230 may be fixed or detachable. In some embodiments, when the insertion portion 260 is inserted into the chamber 220, the fixing elements 230 may be pushed upwards, and the elastic component 240 may be compressed. The compressed elastic component 240 may exert a compressive force on the plurality of fixing elements towards the opening of the chamber 220 to help the locking between the plurality of fixing elements 230 and the groove 280. The elastic component 240 may include a spring, an elastic rod, or the like, or a combination thereof.

Additionally or alternatively, a first magnet 250 may be mounted on or placed in the bottom body portion 121. The first magnet 250 may be made of a magnetic material, such as magnetite, iron oxide, or the like. The fixing elements 230 may be made of a magnetic material, such as cobalt, iron, nickel, manganese, etc., or an oxide thereof, or an alloy thereof, or any combination thereof. The first magnet 250 may generate a magnetic force to attract the plurality of fixing elements 230 towards the first magnet 250. When the insertion portion 260 is inserted into the chamber 220 of the cartridge 210, the plurality of fixing elements 230 may be attracted by the first magnet 250 toward the opening of the cartridge 210. In some embodiments, both the chamber 220 and the insertion portion 260 each may have the shape of a body of revolution. The top component 110 may rotate relative to the bottom component 120 about an axis in the insertion direction of the insertion portion 260. The insertion direction of the insertion portion 260 may be the direction along which the insertion portion 260 is inserted into the opening of the chamber 220.

Figure 2B:
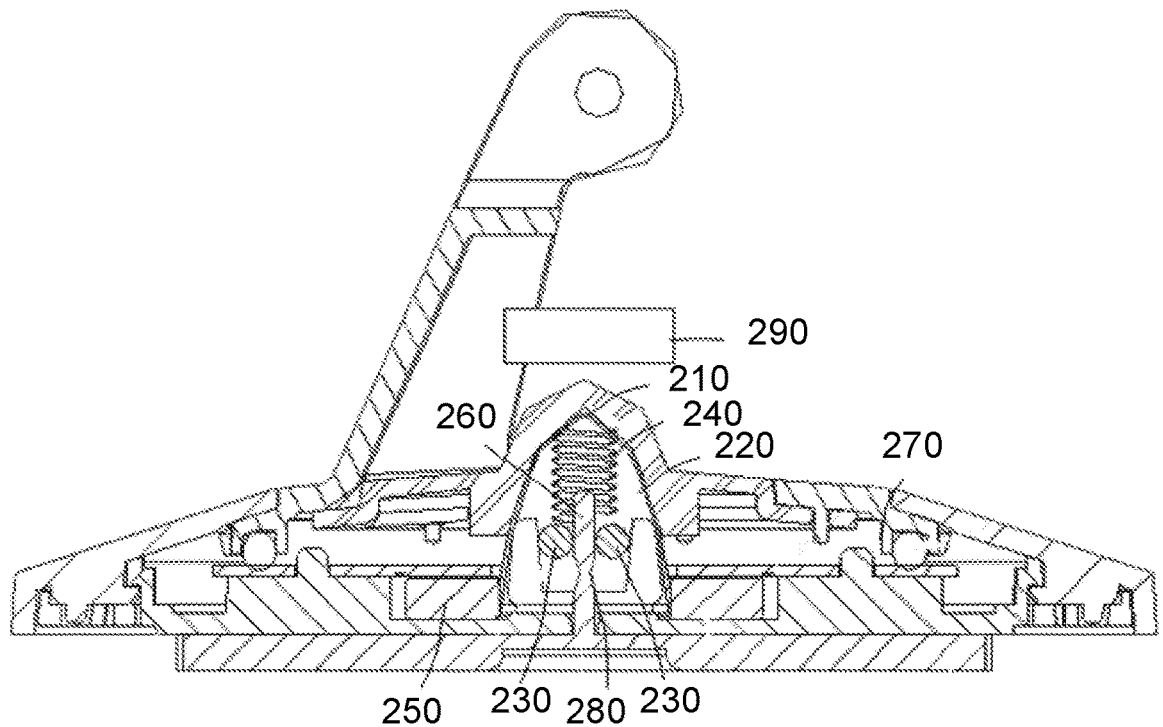
FIG. 2B is a cross-sectional view of an exemplary unlocked camera stand according to some embodiments of the present disclosure.

FIG. 2B is a cross-sectional view of an exemplary unlocked camera stand according to some embodiments of the present disclosure. The magnetic force and the elastic force may be applied to the plurality of fixing elements 230. The second magnet 290, an external magnet used for unlocking, may be used to attract the plurality of fixing elements 230. When the second magnet 290 is placed on the side of the cartridge 210 away from the first magnet 250, the second magnet 290 may attract the plurality of fixing elements 230 away from the opening of the chamber 220. Then, the insertion portion 260 may be disengaged from the cartridge 210. More descriptions regarding the unlocking process may be found elsewhere in the present disclosure, e.g., FIG. 6A, FIG. 6B, and descriptions thereof.

In some embodiments, the first magnet 250 may be an electromagnet. By reducing/cutting a current source to the electromagnet during the unlocking process, the magnetism of the first magnet 250 may decrease or disappear. In some embodiments, the first magnet 250 may be a permanent magnet. In this case, the movement of the plurality of fixing elements 230 may depend on one or more factors including the distances between the plurality of the fixing elements 230 and the first magnet, the distances between the plurality of the fixing elements 230 and the second magnet, the magnetic strength of the first magnet, and/or the magnetic strength of the second magnet. In some embodiments, the plurality of fixing elements 230 may be attracted by the second magnet 290 in a direction away from the opening of the chamber 220, which may lead to a compression of the elastic component 240. In some embodiments, the magnetic force generated by the second magnet 290 may be higher than the compressive force generated by the elastic component 240 and/or the magnetic force generated by the first magnet 250.

Figure 3A:
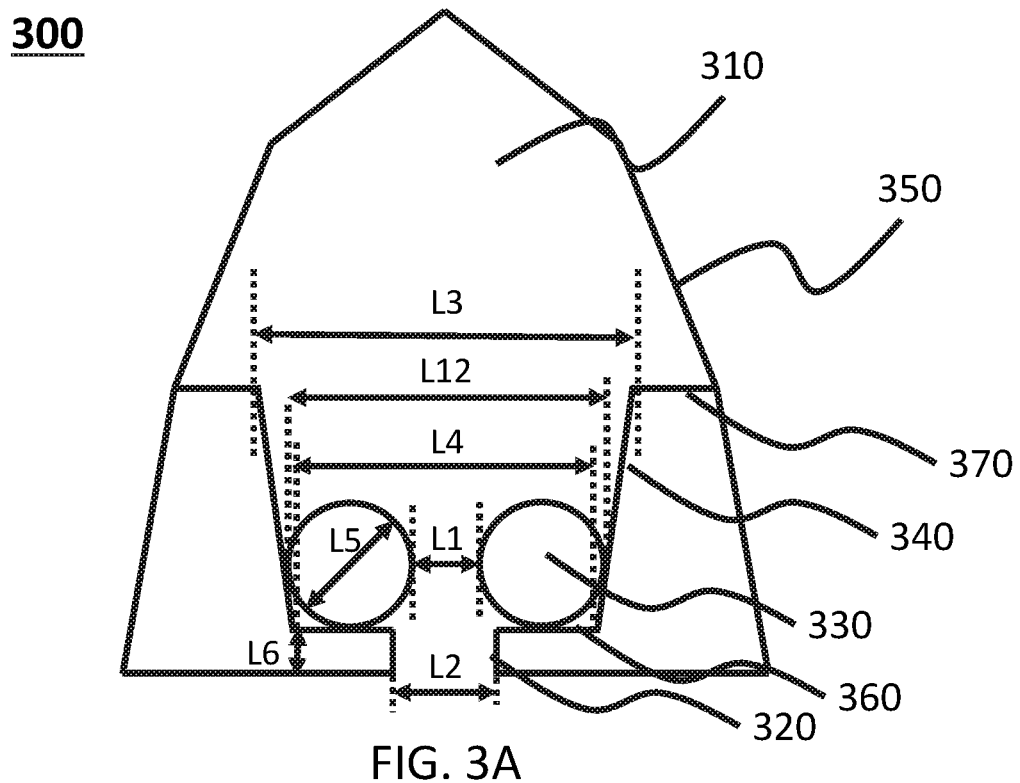
FIG. 3A is a front view of a cross-section of an exemplary cartridge according to some embodiments of the present disclosure.
Figure 3B:
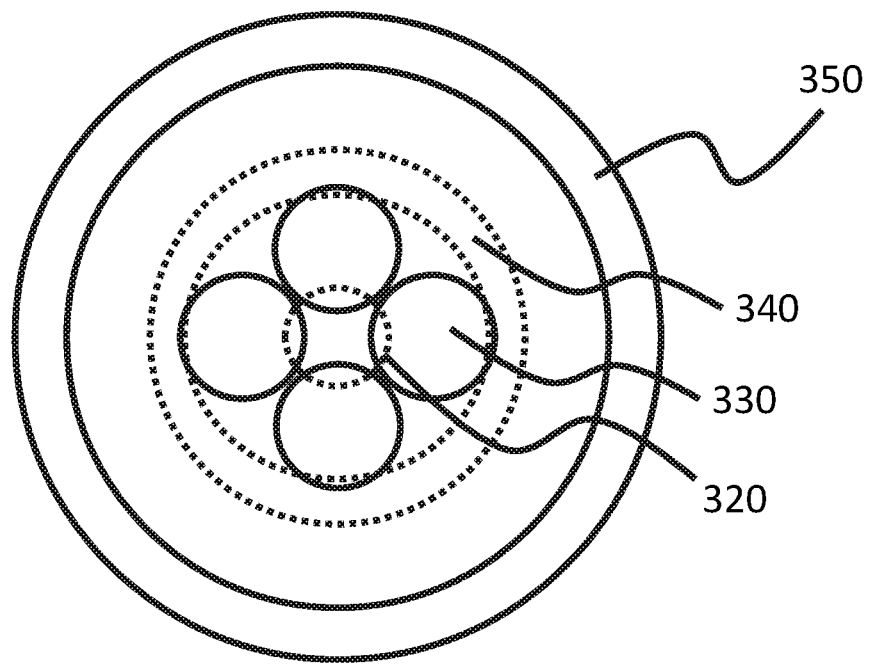
FIG. 3B is a top view of a cross-section of an exemplary cartridge according to some embodiments of the present disclosure.

FIG. 3A is a front view of a cross-section of an exemplary cartridge according to some embodiments of the present disclosure. The cartridge 300 may correspond to the cartridge 113 in FIG. 1 and/or the cartridge 210 in FIG. 2. As shown in FIG. 3A, the cartridge 300 may include a shell 350 and a chamber (or space) 310 enclosed by the shell 350. The cartridge 300 may have the shape of a solid of revolution (e.g., a 3D shape formed by rotating a 2D shape along a rotation axis). As shown in FIG. 3B, the top view of components in the cartridge 300 are essentially circular.

The cartridge 300 may include a plurality of fixing elements 330 placed inside the chamber 310 (e.g., on the bottom inner surface 360 of the chamber 310). The plurality of fixing elements 330 may be of the same or different sizes and/or shapes. For example, the plurality of fixing elements 330 may be spheres of the same size (e.g., each with a diameter of L5). As another example, some of the plurality of fixing elements 330 may have the shape of a spheroid while some of the plurality of fixing elements 330 may have the shape of a sphere. In some embodiments, the plurality of fixing elements 330 may be made of a magnetic material. Exemplary magnetic materials may include cobalt, iron, nickel, manganese, etc., or an oxide thereof, or an alloy thereof, or any combination thereof. A fixing element 330 may function like a magnet that produces a magnet field or an object that may be magnetized and attracted by a magnet. Merely by way of example, the locations of the plurality of fixing elements 330 may be adjusted by placing one or more magnets outside the cartridge 300 at different locations. For example, a first magnet (e.g., the first magnet 250) may be placed in the bottom component (e.g., the bottom component 120). The first magnet may generate a magnetic force to attract the plurality of fixing elements 330 towards the bottom component. As another example, a second magnet (e.g., second magnet 290) may be placed outside the cartridge 300 on a side opposite to the first magnet. The second magnet may generate a magnetic force to attract the plurality of fixing elements 330 in a direction away from the bottom component. When both the first magnet and the second magnet exist, the movement of the plurality of fixing elements 330 may depend on one or more factors including, e.g., the distances between the plurality of the fixing elements 330 and the first magnet, the distances between the plurality of the fixing elements 330 and the second magnet, the magnetic strength of the first magnet, and/or the magnetic strength of the second magnet.

In some embodiments, the cartridge 300 may include a slope section 340 (also referred to as an inner wall). Merely by way of example, a top end of the slope section 340 may be connected to the flat section 370 of the cartridge 300, and a bottom end of the slope section 340 may be connected to the bottom inner surface 360 of the cartridge 300. The fixing elements 330 may move along the slope section 340. Merely by way of example, the width (or diameter in a case the top end of the slope section 340 is circular) of the top end of the slope section 340 (L3) may be wider than the width (or diameter in a case the bottom end of the slope section 340 is circular) of the bottom end of the slope section 340 (L4). In some embodiments, the width or diameter of the slope section 340 may change (e.g., increase) gradually and/or continuously from the bottom end to the top end of the slope section 340. In some embodiments, the width of regions formed by the contact points between the fixing elements 330 and the slope section 340 may be L12. L12 may vary between L3 and L4 when the fixing elements 330 move upwards or downwards along the slope section 340.

In some embodiments, the cartridge 300 may include an opening 320 at the bottom surface for receiving an insertion (e.g., the insertion portion 125 of the bottom component 120) from outside. The width (or diameter in a case the opening is circular) of the opening may be L2. The diameter of the fixing elements 330 L5 may be greater than the width of the opening L2. In some embodiments, the distance between opposite fixing elements 330 may be L1. L1 may be less than L2 when the fixing elements are at their respective initial positions (placed on the bottom inner surface 360 of the cartridge 300), and may increase when the fixing elements move upwards along the slope section 340. As shown in FIG. 3A, L6 may refer to the thickness of the bottom surface of the cartridge 300 or the minimum distance between the bottom of the fixing elements (at their respective initial positions) and the bottom outer surface of the cartridge 300.

FIG. 3B is a top view of a cross-section of an exemplary cartridge according to some embodiments of the present disclosure. As shown in FIG. 3B, there are four fixing elements 330 placed in the chamber 310. However, it should not be limiting. The number (or count) of the fixing elements 330 can be any reasonable integer greater than or equal to 2, such as, 2, 3, 4, 5, 6, 8, 10, etc. The four fixing elements 330 may or may not contact each other at their respective initial positions. In some embodiments, the four fixing elements 330 may contact each other at initial positions. When the fixing elements 330 are pushed upwards by an external insertion (e.g., the insertion portion 125), the fixing elements 330 may not contact each other anymore. As shown in FIG. 3B, the width or diameter of the opening 320 may be smaller than the diameter of any of the fixing elements 330. The center of the opening 320 and/or the center of the slope section 340 may coincide with the center of the cartridge 300. In some embodiments, the cartridge 300 may further include an elastic component (e.g., the elastic component 240) placed in the chamber 310 (not shown in FIG. 3A and FIG. 3B) above the fixing elements 330. The top end of the elastic component may contact the top inner surface of the cartridge 300 and the bottom end of the elastic component may contact the plurality of fixing elements 330. In some embodiments, the elastic component may contact the fixing elements 330 in some situations. Alternatively, the elastic component may be fixedly connected to the fixing elements 330. When the fixing elements 330 are pushed upwards by an external insertion (e.g., the insertion portion 125, 260), the elastic component may be compressed. The compressed elastic component may exert a downward compressive force on the fixing elements 330.

The compressive force generated by the compressed elastic component may allow the fixing elements to move only in (essentially) a vertical direction (e.g., the upward and downward directions along the slope section 340) and (substantially) prohibit any movement along a direction other than the vertical direction (e.g., a direction towards adjacent fixing elements 330). In some embodiments, other components may be used to limit the movement direction of the fixing component 330. For example, guide rails (not shown in FIG. 3A and FIG. 3B) may be installed on the slope section 340 to guide the fixing elements 330 to move only in vertical directions.

Figure 4A:
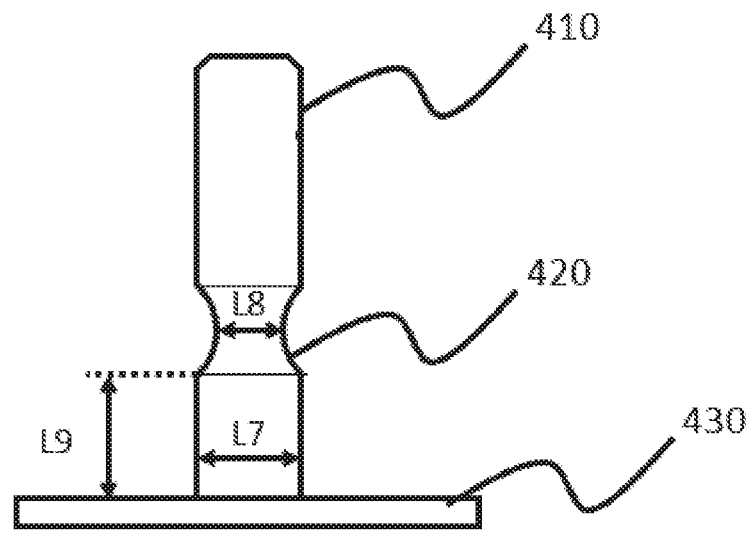
FIG. 4A is a front view of a cross-section of an exemplary base portion according to some embodiments of the present disclosure.

FIG. 4A is a front view of a cross-section of an exemplary base portion according to some embodiments of the present disclosure. The base portion 400 may be used in pairs with the cartridge 300. The base portion 400 may correspond to base portion 122. The insertion portion 410 may correspond to the insertion portion 125 and the insertion portion 260. The annular groove 420 may correspond to the annular groove 280.

As shown in FIG. 4A, the base portion 400 may include a base board 430 and an insertion portion 410 installed on the base board 430. The insertion portion 410 may include an annular groove 420 along its circumference. The shape of the annular groove 420 may be complementary to the shape of the fixing elements. For example, the fixing elements may be spheres, and the shape of the cross-section of the annular groove 420 in a side view or front view may be an arc. As another example, the fixing elements may be cuboids, and the shape of the cross-section of the annular groove 420 in a side view or front view may be a rectangle. In some embodiments, the width (or diameter) of the insertion portion 410 (L7) may be equal to or slightly smaller than the width (or diameter) of the opening 320 of the cartridge 300 (L2). The minimum width of the insertion portion 410 at the annular groove 420 (L8) may be essentially equal to the distance between opposite fixing elements 330 (L1). L9 may refer to a distance between the bottom end of the annular groove 420 and the base board 430. L9 may be greater than or equal to the thickness of the bottom surface of cartridge 300 (L6). In a case that L9 is equal to L6, there may be no gap between the bottom outer surface of the cartridge 300 and the base board 430 when the insertion portion 410 is inserted and locked in the chamber 310. In a case that L9 is greater than L6, there may be a gap between the bottom outer surface of the cartridge 300 and the base board when the insertion portion 410 is inserted and locked in the chamber 310.

Figure 4B:
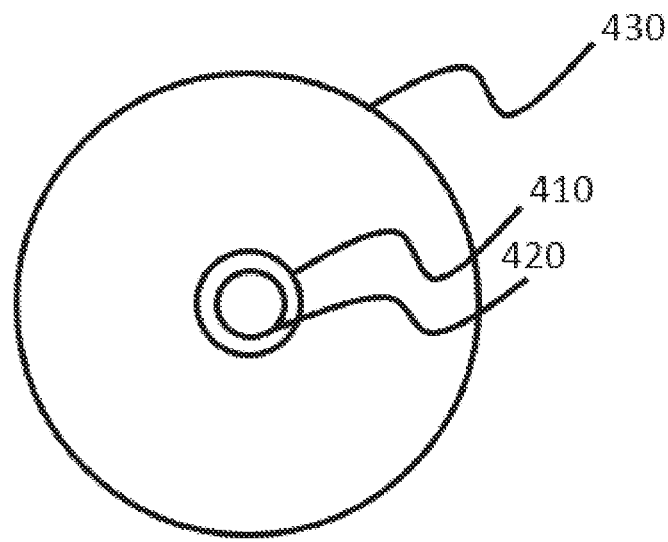
FIG. 4B is a top view of a cross-section of an exemplary base portion according to some embodiments of the present disclosure.

FIG. 4B is a top view of a cross-section of an exemplary base portion according to some embodiments of the present disclosure. As shown in FIG. 4B, the insertion portion 410 may be placed on the center of the base board 430. The annular groove 420 may be uniformly arranged along the circumference of the insertion portion 410.

Figure 5A:
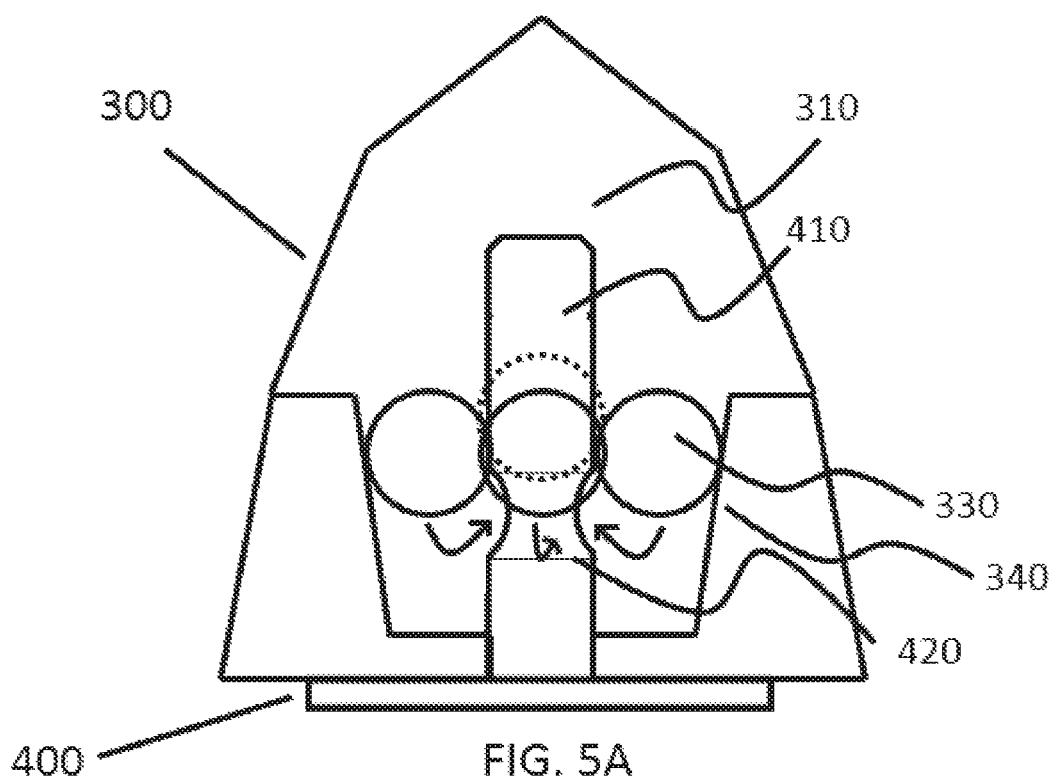
FIG. 5A is a front view of cross-sections of an exemplary cartridge and an exemplary base portion during a locking process according to some embodiments of the present disclosure.

FIG. 5A is a front view of cross-sections of an exemplary cartridge and an exemplary base portion during a locking process according to some embodiments of the present disclosure. In some embodiments, the insertion portion 410 of the base portion 400 may be inserted into the cartridge 300 via the opening (e.g., the opening 320). When the insertion portion 410 is just inserted into the chamber 310, the width of regions formed by the contact points between the fixing elements 330 and the slope section 340 (L12) may be greater than a sum of the width of the insertion portion 410 and twice of the diameter of fixing elements (L7+2*L5). In other words, the L12 is not wide enough to accommodate both the insertion portion 410 and the two fixing elements 330. Further insertion of the insertion portion 410 may push the fixing elements 330 upwards along the slope section 340. An elastic component (e.g., the elastic component 240) may be placed between the top inner surface of the cartridge 300 and the fixing elements 330. The elastic component may be compressed when the fixing elements 330 move upwards. The compressed elastic component may exert a downward compressive force on the fixing elements 330. A first magnet (e.g., the first magnet 250) may be placed on the side of the base portion 400 (e.g., in the bottom component 120) and the fixing elements 330 may be made of one or more magnetic materials. The first magnet may generate a magnetic force on the fixing elements 330 towards the direction of the base portion 400 (e.g., the downward direction). The width of regions formed by the contact points between the fixing elements 330 and the slope section 340 (L12) may increase gradually when the fixing elements moves upwards along the slope section 340. When the width of regions formed by the contact points between the fixing elements 330 and the slope section 340 (L12) is equal to the sum of the width of the insertion portion 410 and twice of the diameter of fixing elements 330 (L7+2*L5), the insertion portion 410 may insert further while the fixing elements 330 are not pushed upward further (e.g., remaining static at certain locations) as L12 is wide enough to accommodate both the insertion portion 410 and the two fixing elements 330. When the insertion portion 410 is further inserted such that the annular groove 420 reaches the locations of the fixing elements 330, the compressive force generated by the elastic component, or the magnetic force generated by the first magnet may cause the fixing elements 330 to slip into the annular groove 420 (as shown in FIG. 5A) and be secured between the annular groove 420 and the slope section 340. The compressive force and the magnetic force may also cause the fixing elements 330 to move downwards together with the insertion portion 410 (as shown in FIG. 5B).

Figure 5B:
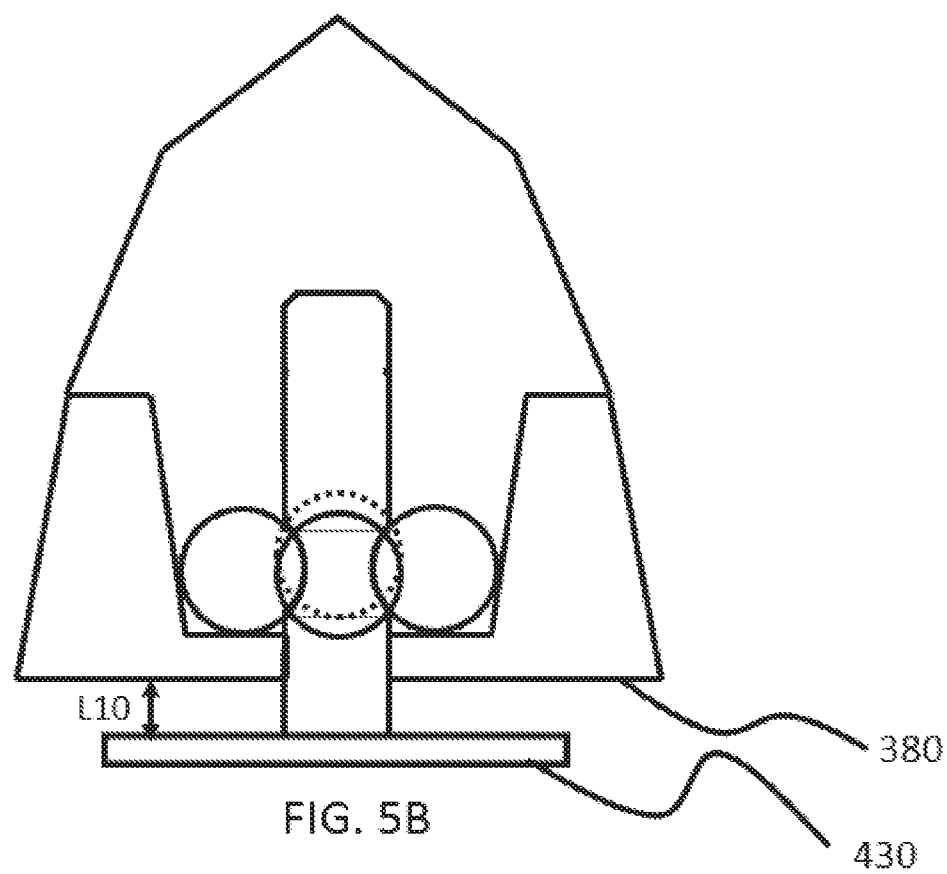
FIG. 5B is a front view of cross-sections of an exemplary cartridge and an exemplary base portion after a locking process according to some embodiments of the present disclosure.

As shown in FIG. 5B, the fixing elements 330 may be secured by the annular groove 420 and the slope section 340 at first locations. The securing of the fixing elements 330 may cause the top component (e.g., the top component 110) to be locked with the bottom component (e.g., the bottom component 120). L10 may refer to a distance between the bottom outer surface 380 of the cartridge 300 and the top surface of the base board 430. Merely by way of example, L10 may be equal to the difference between a distance between the bottom end of the annular groove 420 and the base board 430 (L9) and the thickness of the bottom surface of the cartridge 300 (L6) (e.g., L10=L9−L6).

It should be noted that the above descriptions regarding the securing process of the fixing elements 330 is based on a situation that L10 is not zero (or L9 is greater than L6). In this case, the insertion portion 410 may insert further when the fixing elements 330 becomes static already. The fixing elements 330, the slope section 340, the insertion portion 410, and/or the surfaces of the annular groove may be made of a material that hardly deforms. However, it should not be limiting. The distance between the bottom outer surface 380 of the cartridge 300 and the top surface of the base board 430 (L10) may be zero (in other words, the distance between the bottom end of the annular groove 420 and the base board 430 (L9) may be equal to the thickness of the bottom surface of the cartridge 300 (L6)). L10 being zero may indicate that as soon as the fixing elements 330 become static, they meet up and are locked into the annular groove 420. In this case, the fixing elements 330, the slope section 340, the insertion portion 410, and/or the surfaces of the annular groove 420 may allow slight deformation(s). The compressive force generated by the elastic component and/or the magnetic force generated by the first magnet when L10 is zero may be higher than the compressive force generated by the elastic component and/or the magnetic force generated by the first magnet when L10 is greater than zero. In some embodiments, the locked fixing elements 330 may be unlocked by putting a second magnet on a side of the cartridge 300. The second magnet may attract the plurality of fixing elements in a direction away from the base board 430 (e.g., the upward direction). When the fixing elements 330 are caused to be displaced from the first location (the location where they are secured) by the magnetic force generated by the second magnet, the fixing elements 330 may no longer be secured between the between the annular groove 420 and the slope section 340. More descriptions regarding unlocking/unsecuring process of the top component and the bottom component may be found elsewhere in the present disclosure, e.g., FIG. 6A, FIG. 6B, and the descriptions thereof. Merely by way of example, the unlocking/unsecuring process when L10 is greater than zero may correspond to FIG. 6A, FIG. 6B and descriptions thereof. The unlocking/unsecuring process when L10 is equal to zero may correspond to FIG. 6B and descriptions thereof.

Figure 6A:
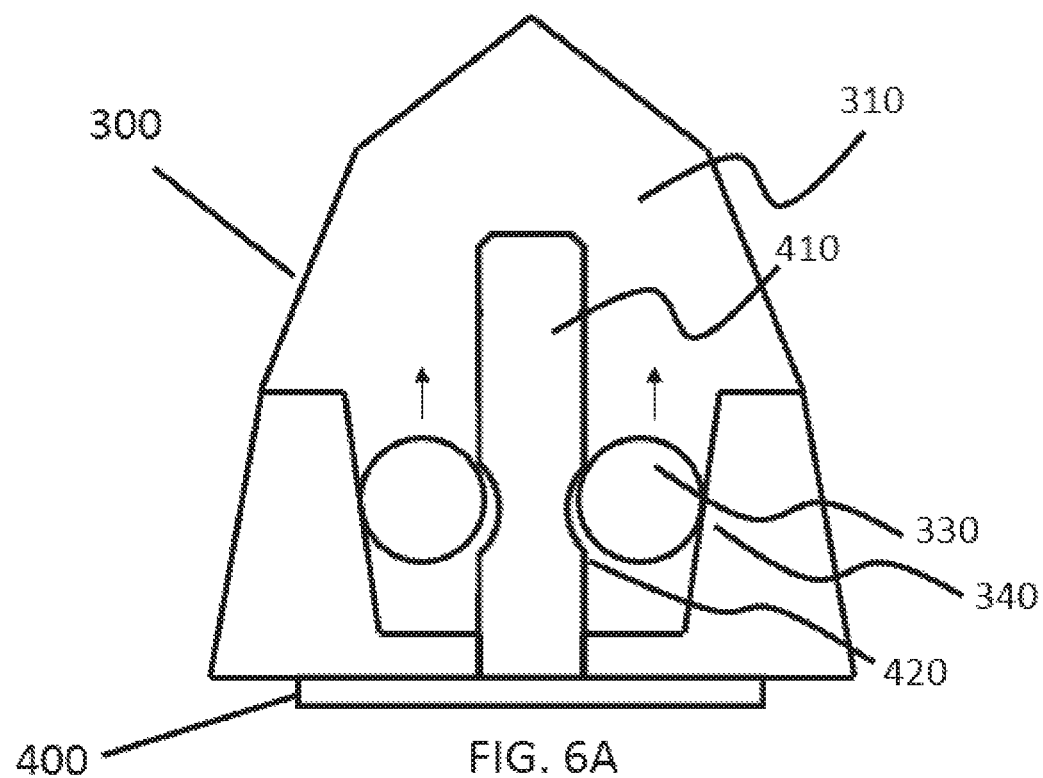
FIG. 6A is a front view of cross-sections of an exemplary cartridge and an exemplary base portion during an unlocking process according to some embodiments of the present disclosure.

FIG. 6A is a front view of cross-sections of an exemplary cartridge and an exemplary base portion during an unlocking process according to some embodiments of the present disclosure. A second magnet not shown in FIG. 6A (e.g., the second magnet 290) may generate a magnetic force to attract the fixing elements 330 to move upwards along the slope section 340 together with the insertion portion 410. When the insertion portion 410 and the fixing elements 330 reach the locations where the fixing elements 330 previously slipped into the annular groove 420 during the locking process as mentioned in FIG. 5A, the magnetic force may attract the fixing elements 330 to slip out of the annular groove 420. Because the fixing elements 330 are no longer secured between the annular groove 420 and the slope section 340, the top component (e.g., the top component 110) is no longer locked with the bottom component (e.g., the bottom component 120), the insertion portion 410 may be easily pulled out of the chamber 310 via the opening of the chamber 310 and the top component and the bottom component are separated.

Figure 6B:
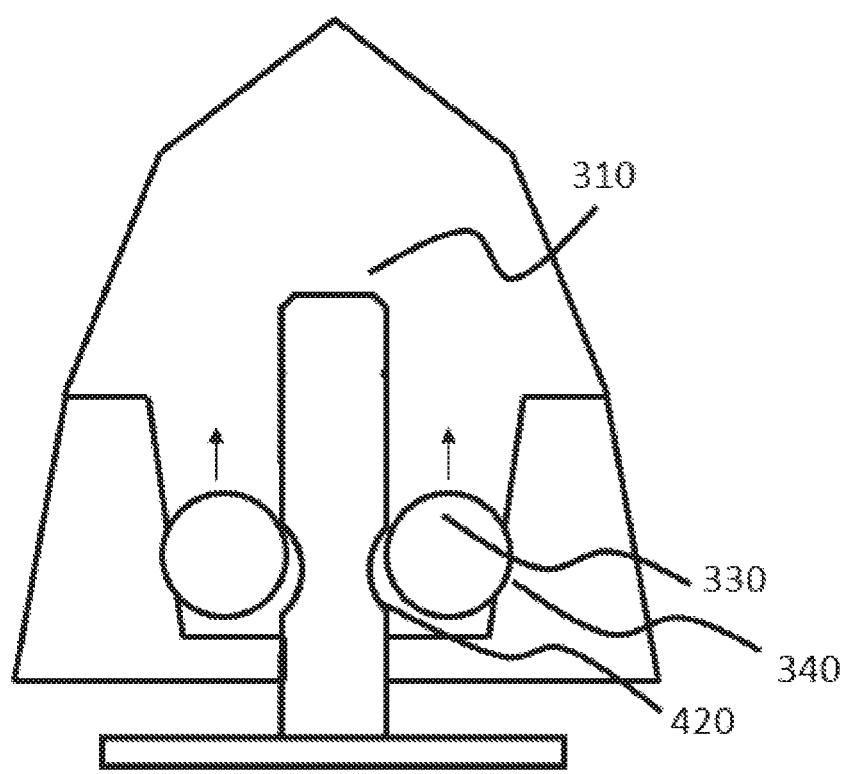
FIG. 6B is a front view of cross-sections of an exemplary cartridge and an exemplary base portion during another unlocking process according to some embodiments of the present disclosure.

FIG. 6B is a front view of cross-sections of an exemplary cartridge and an exemplary base portion during another unlocking process according to some embodiments of the present disclosure. As shown in FIG. 6B, the magnetic force generated by the second magnet may attract the fixing elements 330 to move upwards along the slope section 340 but not together with the insertion portion 410. Merely by way of example, the fixing elements 330, the slope section 340, the insertion portion 410, and/or the surfaces of the annular groove 420 may allow slight deformation(s) such that when the magnetic force attracts the fixing elements 330, the fixing elements 330, the slope section 340, the insertion portion 410, and/or the surfaces of the annular groove 420 may be slightly deformed to allow the fixing elements 330 to slip out of the annular groove 420 and move upwards.

It should be noted that the above description is merely provided for the purposes of illustration, and not intended to limit the scope of the present disclosure. For persons having ordinary skill in the art, multiple variations and modifications may be made under the teachings of the present disclosure. However, those variations and modifications do not depart from the scope of the present disclosure.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A stand, comprising:
a first connecting component including at least one fixing element and a chamber, the chamber having an opening, wherein the at least one fixing element is made of a magnetic material; and
a second connecting component including an insertion portion,
wherein when the insertion portion of the second connecting component is inserted, along an axis in an insertion direction, into the chamber through the opening, the at least one fixing element in the first connecting component works in pairs with the insertion portion to cause the first connecting component to be connected with the second connecting component, the at least one fixing element is secured between an inner wall of the chamber and the insertion portion to cause the first connecting component to be connected with the second connecting component;
a first magnet placed in the second connecting component, the first magnet being configured to cause the at least one fixing element to be secured between the inner wall of the chamber and the insertion portion,
wherein when the insertion portion is inserted into the chamber through the opening, the first magnet attracts the at least one fixing element towards the second connecting component and causes the at least one fixing element to be secured at a first location between the inner wall of the chamber and the insertion portion;
wherein a second magnet is placed on a side of the first connecting component, the second magnet being configured to:
attract the at least one fixing element in a direction away from the second connecting component; and
cause the at least one fixing element to be displaced from a first location such that the at least one fixing element is no longer secured between an inner wall of the chamber and the insertion portion to unlock the first connecting component and the second connecting component.

2. The stand of claim 1, wherein when the first connecting component is connected with the second connecting component, the first connecting component and the second connecting component are locked relative to each other in a direction that is the same as or opposite to the insertion direction, and
the first connecting component and the second connecting component are rotatable relative to each other about the axis along the insertion direction.

3. The stand of claim 1, wherein the insertion portion includes an annular groove, and
when the insertion portion is inserted into the chamber through the opening, the at least one fixing element is secured between the inner wall of the chamber and the annular groove of the insertion portion.

4. The stand of claim 1, further comprising:
an elastic component placed in the chamber and configured to cause the at least one fixing element to be secure between the inner wall of the chamber and the insertion portion.

5. The stand of claim 4, wherein the elastic component is relaxed before the insertion portion is inserted into the chamber, and
when the insertion portion is inserted into the chamber, the elastic component is compressed and generates a compressive force that causes the at least one fixing element to be secured between the inner wall of the chamber and the insertion portion.

6. The stand of claim 1, wherein the first connecting component is operably connected to a camera.

7. A system, comprising:
an imaging apparatus; and
a stand connected to the imaging apparatus, the stand comprising:
a first connecting component including at least one fixing element and a chamber, the chamber having an opening, wherein the at least one fixing element is made of a magnetic material; and
a second connecting component including an insertion portion,
wherein when the insertion portion of the second connecting component is inserted, along an axis in an insertion direction, into the chamber through the opening, the at least one fixing element in the first connecting component works in pairs with the insertion portion to cause the first connecting component to be connected with the second connecting component, the at least one fixing element is secured between an inner wall of the chamber and the insertion portion to cause the first connecting component to be connected with the second connecting component;
a first magnet placed in the second connecting component, the first magnet being configured to cause the at least one fixing element to be secured between the inner wall of the chamber and the insertion portion,
wherein when the insertion portion is inserted into the chamber through the opening, the first magnet attracts the at least one fixing element towards the second connecting component and causes the at least one fixing element to be secured at a first location between the inner wall of the chamber and the insertion portion;
wherein a second magnet is placed on a side of the first connecting component, the second magnet being configured to:
attract the at least one fixing element in a direction away from the second connecting component; and cause the at least one fixing element to be displaced from a first location such that the at least one fixing element is no longer secured between an inner wall of the chamber and the insertion portion to unlock the first connecting component and the second connecting component.

8. The system of claim 7, wherein when the first connecting component is connected with the second connecting component,
the first connecting component and the second connecting component are locked relative to each other in a direction that is the same as or opposite to the insertion direction, and
the first connecting component and the second connecting component are rotatable relative to each other about the axis along the insertion direction.

9. The system of claim 7, wherein the insertion portion includes an annular groove, and
when the insertion portion is inserted into the chamber through the opening, the at least one fixing element is secured between the inner wall of the chamber and the annular groove of the insertion portion.

10. The system of claim 7, further comprising:
an elastic component placed in the chamber and configured to cause the at least one fixing element to be secure between the inner wall of the chamber and the insertion portion.

11. The system of claim 10, wherein the elastic component is relaxed before the insertion portion is inserted into the chamber, and
when the insertion portion is inserted into the chamber, the elastic component is compressed and generates a compressive force that causes the at least one fixing element to be secured between the inner wall of the chamber and the insertion portion.

12. The system of claim 7, wherein the first connecting component is operably connected to the imaging apparatus.

* * * * *